United States Patent
Watanabe

(10) Patent No.: US 6,870,637 B1
(45) Date of Patent: Mar. 22, 2005

(54) IMAGE PROCESSING METHOD AND IMAGE PROCESSOR USING THE SAME

(75) Inventor: Yoshio Watanabe, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/421,926

(22) Filed: Oct. 21, 1999

(30) Foreign Application Priority Data

Nov. 26, 1998 (JP) ............................................. 10-336332

(51) Int. Cl.⁷ ..................... G06K 15/00; H04N 1/405
(52) U.S. Cl. ...................... 358/1.9; 358/3.06; 358/3.23; 358/518; 358/523
(58) Field of Search .................... 358/1.9, 3.01, 358/3.06, 3.21, 3.23, 3.24, 2.1, 518, 523, 524

(56) References Cited

U.S. PATENT DOCUMENTS

| 5,032,904 A | 7/1991 | Murai et al. ................... 358/75 |
| 5,157,483 A | * 10/1992 | Shoji et al. .................. 358/518 |

FOREIGN PATENT DOCUMENTS

| EP | 0 665 676 A2 | 8/1995 | ............ H04N/1/60 |
| EP | 0 822 704 A2 | 2/1998 | ............ H04N/1/46 |
| JP | 7-143262 | 6/1995 | |
| JP | 7-203207 | 8/1995 | |
| JP | 7-222012 A | 8/1995 | |
| JP | 7-274024 | 10/1995 | |
| JP | 8-123939 | 5/1996 | ............ G06T/1/00 |
| JP | 8-289152 | 11/1996 | |

OTHER PUBLICATIONS

Japanese Office Action dated Feb. 24, 2004.

* cited by examiner

Primary Examiner—Thomas D. Lee
(74) Attorney, Agent, or Firm—Sughrue Mion, PLLC

(57) ABSTRACT

An interface section analyzes print data including data for identifying an object or data showing the setting of color processing and others and sets required color processing in units of a printed page. According to the set color processing, a color processing section sets corresponding color correction table and halftoning processing table in a high speed random access memory for example. The interface supplies a drawing instruction together with attribute data corresponding to the setting in the color processing section to a drawing section. The drawing section plots image data composed of color data every dot according to the drawing instruction and stores the drawing instruction together with the attribute data every dot in an image memory. The color processing section executes optimum or intended color processing for color data in the image memory, referring to a color correction table and a halftoning processing table respectively corresponding to its attribute data and generates image reproduction data. Accordingly, arbitrary color processing can be realized by a controller composed of light hardware.

10 Claims, 8 Drawing Sheets

| OBJECT | COLOR CORRECTION (COLOR MATCHING) | HALFTONING |
|---|---|---|
| TX, GF | PRIORITY TO SATURATION | HIGH FREQUENCY SCREEN (LARGE NUMBER OF LINES PER INCH) |
| IM | PERCEPTUAL MATCHING | LOW FREQUENCY SCREEN (SMALL NUMBER OF LINES PER INCH) |

FIG. 9

| COLOR CORRECTION (COLOR MATCHING) / HALFTONING | PERCEPTUAL MATCHING TO NATURAL COLOR | PRIORITY TO SATURATION |
|---|---|---|
| HIGH FREQUENCY SCREEN | COLOR CORRECTION LUT 0 HALFTONING LUT 0 (X: 000) | COLOR CORRECTION LUT 2 HALFTONING LUT 0 (X: 100) |
| LOW FREQUENCY SCREEN | COLOR CORRECTION LUT 1 HALFTONING LUT 1 (X: 011) | COLOR CORRECTION LUT 3 HALFTONING LUT 1 (X: 111) |

IMAGE PROCESSING METHOD AND IMAGE PROCESSOR USING THE SAME

BACKGROUND OF THE INVENTION

The present invention relates to an image processor in a color electrophotographic printer for reproducing an image utilizing plural colors of toner such as a color printer and a color copying machine and an image processing method used by the same, particularly image processing that enables optimum color processing according to the type of an object and further, arbitrary color processing every predetermined print unit which is smaller than an object.

An image processor in a color electrophotographic printer such as a color printer interprets print data, writes the RGB color data for every dot to a band memory which is an image memory, executes color conversion including specified color correction processing for RGB color data in the band memory, generates the color data of yellow, magenta, cyan and black (YMCK) and executes halftoning processing for applying halftone representation by halftone dots composed of plural dots to the above data. In this specification, color conversion and halftoning processing are called color processing altogether. Image reproduction data generated as a result of color processing is supplied to a printer engine and an image is reproduced on predetermined printing paper.

As for the above color processing, optimum color correction and halftoning processing are different depending upon a printed object image. There is also a case that color correction and halftoning processing are specified in an arbitrary print unit by a creator of images independent of an object image. For example, in the case of an image including many relatively thin lines where the natural change of gradation is small such as a character and a graph, it is desired that the screen ruling is increased possibly to obtain a fine halftone dot and to prevent a void from being made in a character and a line. It is also desired that in color conversion from the color space of RGB to the color space of YMCK, brightness is enhanced possibly, though current color is different from original color without color matching by mixing toner which causes the deterioration of saturation.

On the other hand, in the case of an image in which the natural change of gradation is included in relatively large area such as a picture image, it is desired that the screen ruling is reduced possibly to obtain a coarse halftone dot and to prevent a banding caused by jitter in paper feed from being emphasized and in color conversion, color correction including color matching for matching with original color is made to faithfully reproduce the natural change of gradation in an image.

Heretofore, it is proposed that an identifier for identifying an object in print data is recorded every pixel and color processing according to the identifier is executed. For example, there is disclosed in Japanese Patent Publication No. 10-51653A. Hereby, in color processing, color correction according to an identifier every pixel and binarization processing are executed.

However, in conventional type image processing, a few numbers of color processing set beforehand for every object is merely selected suitably and processed. If color processing is automatically selected depending upon an object or color processing is arbitrarily selected by the creator of images, many color correction tables and many halftoning processing tables respectively used for color processing are required to be provided in a memory. As a result, a problem that hardware composing a color processing section becomes enormous and particularly, a rapid access memory for storing the above tables requires large capacity occurs.

A creator of images may make color coordination such as color enhancement for every arbitrary print unit and the provision of color processing which can flexibly correspond to such color coordination is desired.

SUMMARY OF THE INVENTION

The object of the present invention is to provide an image processor for enabling the selection of arbitrary color processing in an arbitrary print unit utilizing a color processing section composed of relatively simple hardware, a image processing method used by the processor and a recording medium on which a program for instructing a computer to execute the method is recorded.

Further, another object of the present invention is to provide an image processor for enabling arbitrary color coordination utilizing a color processing section composed of relatively simple hardware, an image processing method used by the processor and a recording medium on which a program for instructing a computer to execute the method is recorded.

To achieve the above objects, according to the present invention, an interface section analyzes print data including data for identifying an object or data showing the setting of color processing and sets color processing required in units of a printed page for example. According to the above set color processing, a color processing section sets corresponding color correction table and halftoning processing table in a rapid random access memory for example. The interface sends a drawing instruction together with attribute data corresponding to setting by the color processing section to a drawing section. The drawing section plots image data composed of color data every halftone dot according to the drawing instruction and stores it together with its attribute data every halftone dot in an image memory. The color processing section executes optimum or intended color processing for color data in the image memory referring to a color correction table and a halftoning processing table respectively corresponding to its attribute data and generates image reproduction data.

According to the above invention, even if the capacity of a random access memory of the color processing section is relatively small, required color correction table and halftoning processing table are set every page for example. As a result, the color processing section can execute optimum or intended color processing such as color conversion and halftoning processing for color data in the image memory utilizing tables corresponding to its attribute data.

To achieve the above, there is provided an image processor for performing color conversion including color correction and halftoning of inputted print data to generate image reproduction data which represents gradation of each color by a plurality of halftone dots, comprising:

an interface section for interpreting the print data to generate a drawing instruction, and determining required color correction processing and halftoning processing with respect to every predetermined print unit to generate attribute data;

a drawing section for generating color data with respect to each of the halftone dots and recording the same into an image memory together with the attribute data;

color processing section including a plurality of color correction processing tables and halftoning processing tables, the color processing section for selecting at least one color correction processing table and at least one halftoning processing table out of the plural processing tables in accordance with the attribute data to execute the color correction and the halftoning with respect to the respective color data in the image memory in accordance with the selected processing tables.

In the image processor, the interface section generates a color setting information block including color enhancement data. And a color coordination table is set in the color processing section in accordance with the color enhancement data to execute color coordination processing with respect to the color data.

In the image processor, the predetermined print unit is the unit of an object image including at least a character and an image or a predetermined print unit which is smaller than the above unit and is equal to or larger than a pixel (halftone dot). As color processing is set every predetermined print unit, tables in the color processing section corresponding to the color processing are set and attribute data is provided every halftone dot, the color processing section can execute optimum or desired color processing by executing color processing referring to only attribute data.

BRIEF DESCRIPTION OF THE DRAWINGS

In the accompanying drawings:

FIG. 9 shows an example of the combination of a color correction look-up table and a halftoning processing table.

DETAILED DESCRIPTION OF THE PREFERRED EMBODIMENTS

Figure 1:
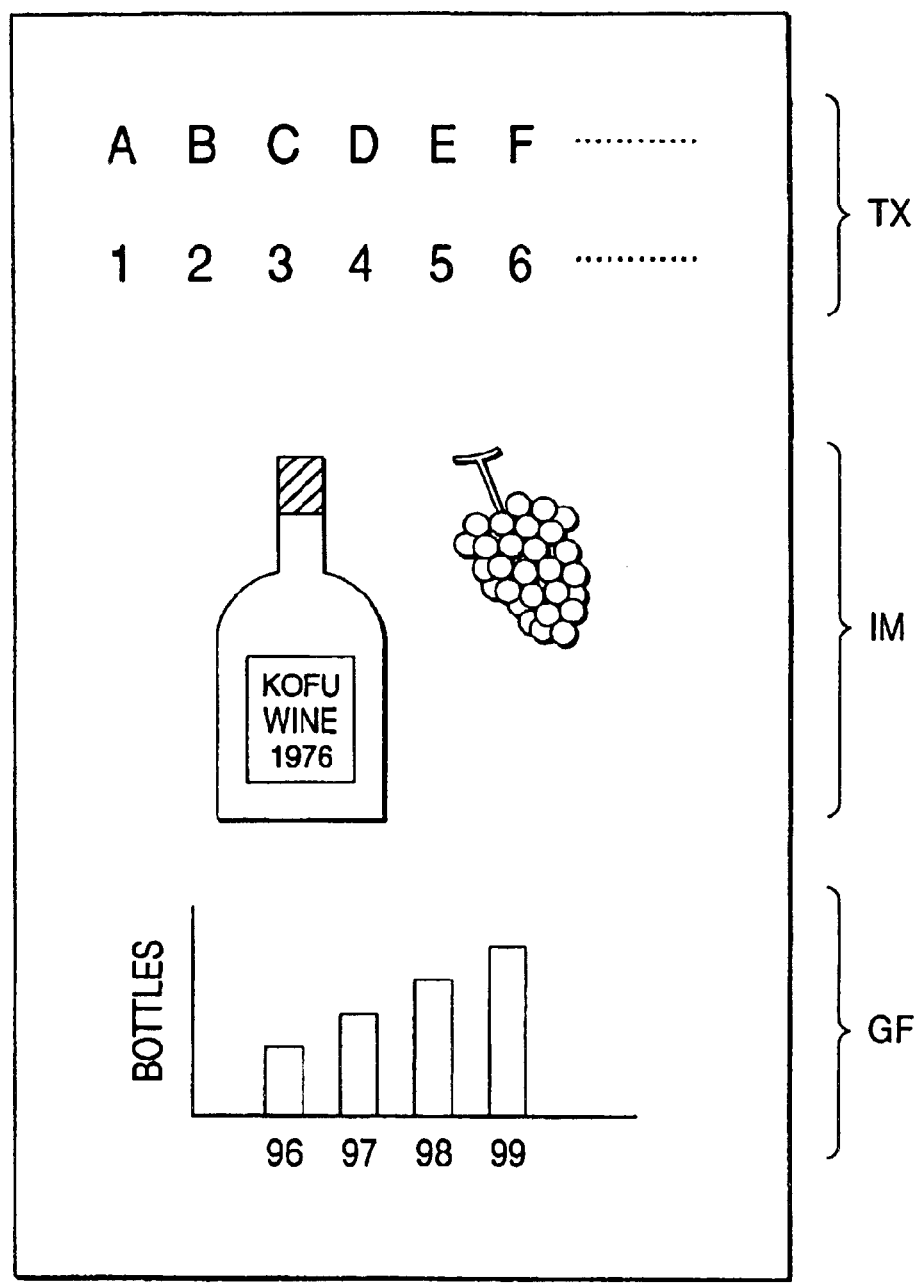
FIG. 1 shows an example of a printed image to be processed by an image processor of the present invention.

Referring to the drawings, an embodiment of the present invention will be described below. However, the technical range or scope is not limited to such an embodiment.

FIG. 1 shows an example of a printed image to be processed by an image processor of the present invention. In the example of a printed image shown in FIG. 1, plural object images such as a character TX, an image IM and a graphic image GF are included in one page. If such plural types of object images are included in a printed image, it is desired that optimum color processing is executed for every object. A controller in a page printer can interpret supplied print data, described in page description language, and detect an object required to be printed.

Figures 2, 3:
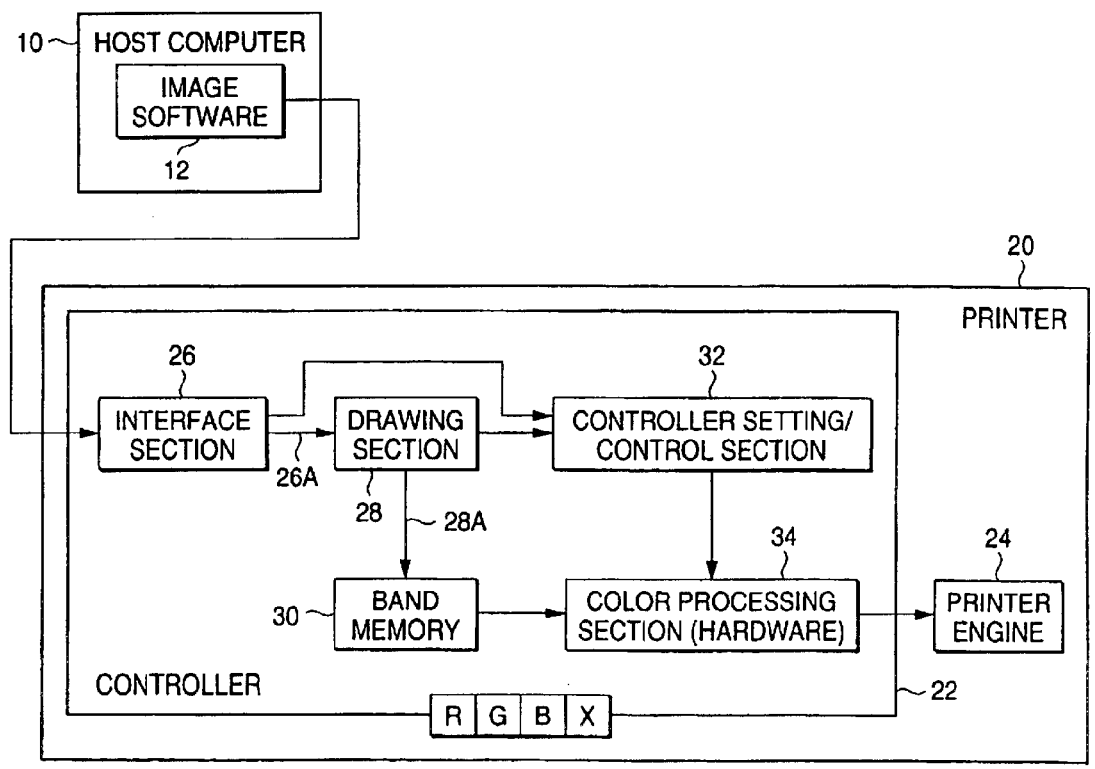
FIG. 2 is a table showing an example of color management in general color processing.
FIG. 3 is a block diagram showing the whole system including an image processor according to one embodiment of the present invention.

FIG. 2 is a chart showing an example of color management in general color processing. As described before, a character and a graphic image are composed of relatively thin lines and do not include the natural change of gradation. Therefore, in the case of color conversion from the color data of RGB supplied from a computer to the color data of YMCK corresponding to the color of toner, it is desirable that saturation is regarded as important possibly in the compression of a color gamut from RGB color space on a display screen to YMCK color space of toner and color correction in which color matching is made and color correction accompanied by the mixture of plural toner is avoided. As a result, the saturation of a printed character and a graph can be emphasized, by avoiding color correction accompanied by the mixture of toner possibly, though the natural change of gradation cannot be reproduced. Further, in halftoning processing (generally called binarization processing) utilizing halftone dots composed of plural dots, it is desirable that a halftone dot is fined possibly and screen ruling is increased. The reason is that a thin line in a character and a graph can be prevented from being unprinted by increasing screen ruling.

On the other hand, in the case of an image, it is rather desirable that the natural change of gradation is reproduced, therefore, faithfully matching to the color of an image on a display is more required than the brightness of color, a coarse halftone dot is required and screen ruling is required to be reduced to prevent a banding from being made by jitter in paper feed and faithfully reproduce the change of gradation.

The reason why color correction accompanied by color matching is made is as follows for example. There is a difference in actual color between RGB color space and YMCK color space of toner, and yellow (Y) theoretically acquired by mixing RGB and yellow by toner are different. Therefore, to faithfully reproduce color generated in RGB color space, it is required to mix toner of magenta (M) with toner of yellow (Y). This is processing for color matching. When such processing is executed, actually printed color is color in which two colors of toner are mixed and saturation in color space is deteriorated. In the case of a character and a graphic image, as such deterioration of saturation causes the deterioration of brightness, it is undesirable. In processing for compressing a color gamut, an area of saturation in color space which can be reproduced by toner of YMCK becomes smaller, compared with RGB color space on a display screen. Therefore, when red (R) in RGB color space is converted to YMCK color space of toner, color conversion is required to be executed in consideration of the deterioration of saturation.

Further, in halftoning processing for changing the size of the above halftone dot, the size of a generated halftone dot can be controlled so that it is an arbitrary size by changing a pattern matrix utilized for binarization processing for example.

In color processing such as the above color correction and halftoning processing, optimum combination is not necessarily uniquely decided every object but arbitrary combination may be also set in a predetermined print unit by the intention of a creator of images. Ultimately, the setting of color processing may be also required to be changed every dot. For example, it is a case that the change of gradation is applied to a part of a character.

In this embodiment, a color processing section that executes color conversion and halftoning processing in a controller of a laser printer utilizes a color correction table and a halftoning processing table. The color correction table is a reference table used for the above compression of a color gamut and color matching processing when RGB color data is converted to YMCK color data. Also, the halftoning processing table is a reference table used when the gradation data of color every dot is converted to binary data showing whether a dot or an area smaller than a dot is printed or not. Therefore, both tables are stored in a random access memory in which rapid access is enabled in the color processing section such as static RAM (SRAM).

To change a method of color correction in color conversion in color processing, it is required to change the above color correction table. Also, to change halftoning processing, it is required to change the halftoning processing table. Further, when screen ruling in halftoning processing is changed, the same color correction table cannot be utilized even in the same color correction. As described above, to enhance the flexibility of color processing, more color correction tables and halftoning processing tables are required to be provided to the color processing section.

In this embodiment, color processing can be changed every object or can be arbitrarily changed by setting by a creator of images without increasing the capacity of a random access memory for storing color correction tables and halftoning processing tables in the color processing section and further, setting can be changed every predetermined print unit. Further, in this embodiment, color coordination such as the highlight of color can be also made using an arbitrary table.

FIG. 3 is a block diagram showing the whole system including an image processor of this embodiment. An electrophotographic printer 20 which is a page printer is connected to a host computer 10 and the print data 14 of an image generated by image software 12 of the host computer 10 is supplied to the electrophotographic printer. The print data 14 is a character string described in predetermined page description language and is input to a controller 22 in the printer 20. An interface section 26 in the controller 22 interprets the print data 14, generates a drawing instruction 26A and supplies the same to a drawing section 28. The drawing section 28 generates color data 28A composed of the gradation data of each color of RGB corresponding to a dot according to the drawing instruction and stores the same in a band memory 30 which is an image memory.

The interface section 26 further analyzes the print data 14 and sets desired color correction and halftoning processing in units of object or in a predetermined print unit. The setting of hardware in a color processing section 34 is controlled by the above setting of color correction and halftoning processing.

For example, print data 14 for one page is analyzed and all color correction tables and halftoning processing tables respectively required for printing one page are set. The required tables are downloaded into a random access memory from which data can be read at a high speed in the color processing section 34. In the controller 22, as described later, plural color correction tables and halftoning processing tables which can correspond to any color correction and halftoning processing are stored in a read-only memory (ROM) beforehand. Tables corresponding to color correction and halftoning processing required in one page are downloaded into the random access memory. The address of the memory into which the tables are downloaded is supplied to a controller setting/control section 32 as the attribute data of color processing by the interface section 26 and the controller setting/control section 32 controls the downloading of tables in the color processing section 34 according to the above address.

The interface section 26 generates attribute data Xn showing the combination of tables required in a predetermined print unit according to the addresses of the tables stored in the random access memory in the color processing section 34 and supplies the same together with the drawing instruction to the drawing section 28. The attribute data Xn is stored corresponding to each dot together with RGB color data in the band memory 30 by the drawing section 28.

The color processing section 34 executes color processing in response to a command from the controller setting/control section 32. That is, the color processing section directly reads RGB color data recorded in the band memory and attribute data Xn for color processing and converts RGB color data to YMCK color data. In the above color conversion, the color processing section 34 refers to a color correction table, which attribute data Xn specifies. Further, the color processing section 34 executes halftoning processing (binarization processing) for YMCK color data for every dot to which color conversion is applied and generates image reproduction data. In the above halftoning processing, the color processing section 34 also refers to a halftoning processing table which attribute data Xn specifies. The above image reproduction data is converted to a laser driving pulse signal every dot and supplied to a printer engine 24 in the case of a laser printer.

As described above, the interface section 26 interprets print data, generates a drawing instruction and downloads tables required for color processing in the color processing section 34 via the controller setting/control section 32. Further, the interface section 26 generates attribute data Xn for color processing adapted to the tables downloaded in the color processing section 34. The color processing section 34 can recognize which table out of the downloaded tables is to be utilized by only referring to the above attribute data Xn. Therefore, the interface section 26 is not required to supply the information of which color processing such as color correction and screen processing is to be executed to the color processing section 34. Each table is set in an address in the memory decided by the interface section 26 in the color processing section 34 and attribute data Xn showing which table is to be referred for every dot recorded together with RGB color data in the band memory. Afterward, the color processing section 34 executes desired color processing referring to the downloaded color correction table and halftoning processing table according to the attribute data Xn with respect to every dot.

To set a color correction table and a halftoning processing table respectively required for the above color processing and set tables and attribute data in the color processing section, the interface section 26 generates a color setting information block provided with various setting data required for color processing and stores it in a memory. According to the above first generated color setting information block, tables and attribute data are set in the color processing section 34.

Figure 4:
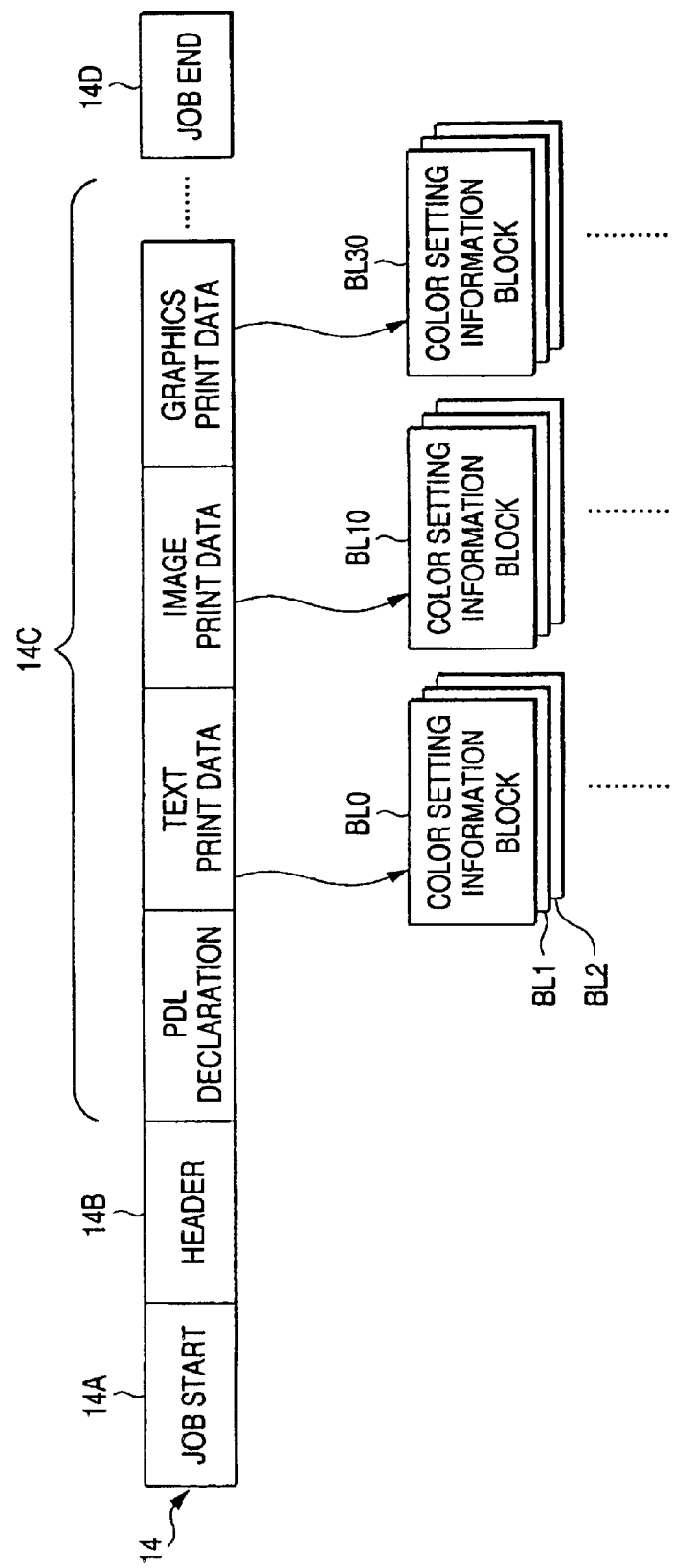
FIG. 4 shows the relationship between print data and a color setting information block.

FIG. 4 shows the relationship between print data and a color setting information block. Print data 14 is composed of a job start code 14A and is composed of a header 14B, contents 14C and a job end code 14D in order. Management information such as the number of pages, printed copies and paper size is included in the header 14B. In the contents 14C, print data is included for every object image such as a character, an image and graphics next to the declaration of page description language (PDL).

In character print data, the information of where on paper, in which font, which character, in which size and color and how (contrast, brightness and others) is printed for example is included. Also, in image print data, the information of, in which area of paper, in which color and how printing is executed for example, is included as data for every dot. Further, in graphic image print data, the information of where on paper, which graph or character, in which size and color, and how is printed for example, is included.

The interface section 26 interprets the print data and generates color setting information blocks BL0 to BL30 and others in a predetermined print unit. The above color setting information block BLn may be also generated every object or may be also generated in a print unit which is smaller than an object. Ultimately, the above block may be also generated in units of dot.

Figure 5:
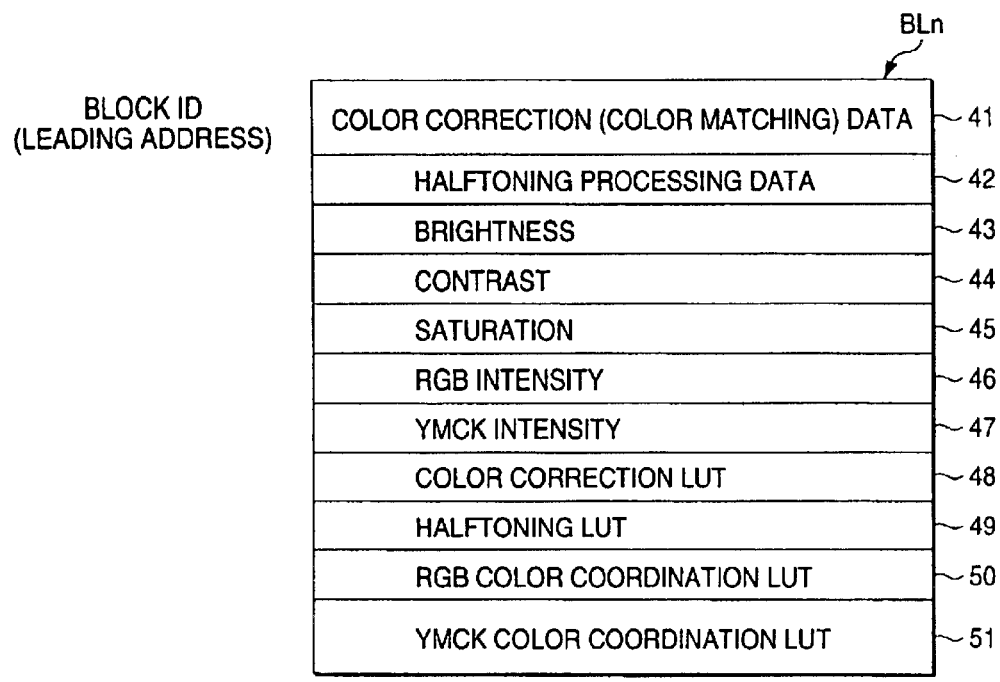
FIG. 5 shows an example of the color setting information block.

FIG. 5 shows an example of a color setting information block. A color setting information block BLn includes brightness 43, contrast 44, saturation 45, each intensity RGB 46 and each intensity of YMCK 47 respectively acquired from the above print data 14. Further, the above block is provided with color correction data 41 showing how color correction (including color matching) in color conversion is executed and halftoning processing data 42 showing how halftoning processing is executed. The above color correction data 41 and halftoning processing data 42 are set according to the type of an object for example.

For example, in the case of a character and graphics, color correction in case brightness is regarded as important in halftoning processing utilizing a fine halftone dot is set or in the case of an image, color correction in case the reproduction of as the natural change of gradation as possible is intended in halftoning processing utilizing a coarse halftone dot is set. Therefore, in this case, according to an object of print data, the above color correction data 41 and halftoning processing data 42 are set. Or if a creator of images changes and sets color processing every object, the set data is included in print data and according to it, the data 41 and 42 are set.

The interface section 26 sets a corresponding halftoning processing table (a look-up table (LUT)) 49 according to the above halftoning processing data 42. The interface also sets a color correction table 48 corresponding to the above set halftoning processing according to the color correction data 41. That is, more concretely, a pointer value showing the leading address of a selected table out of plural color correction tables and halftoning processing tables recorded beforehand in a read-only memory (ROM) in the controller 22 is recorded as the data of the color correction table 48 and the halftoning processing table 49.

Further, the interface section 26 sets an RGB color coordination table 50 according to RGB intensity data 46 and sets a YMCK color coordination table 51 according to YMCK intensity data 47. The setting of these color coordination tables will be described in detail later.

The above color correction data 41 and halftoning processing data 42 may be also set in a predetermined print unit which is smaller than an object as described above. Further, the above color correction and halftoning processing may be also arbitrarily set by a creator of images. In that case, as described above, the type of set color correction and the type of set halftoning processing are included in the print data 14 every predetermined print unit.

After the interface section 26 generates a color setting information block BLn for one page according to print data and records the same in the memory, the leading address of the color setting information block BLn is supplied to the drawing section 28 and the controller setting/control section 32 as ID data of the block. The setting of color correction tables and halftoning processing tables in the color processing section 34 and the decision of attribute data showing which of the set tables is to be used are made based upon the color setting information block.

Figure 6:
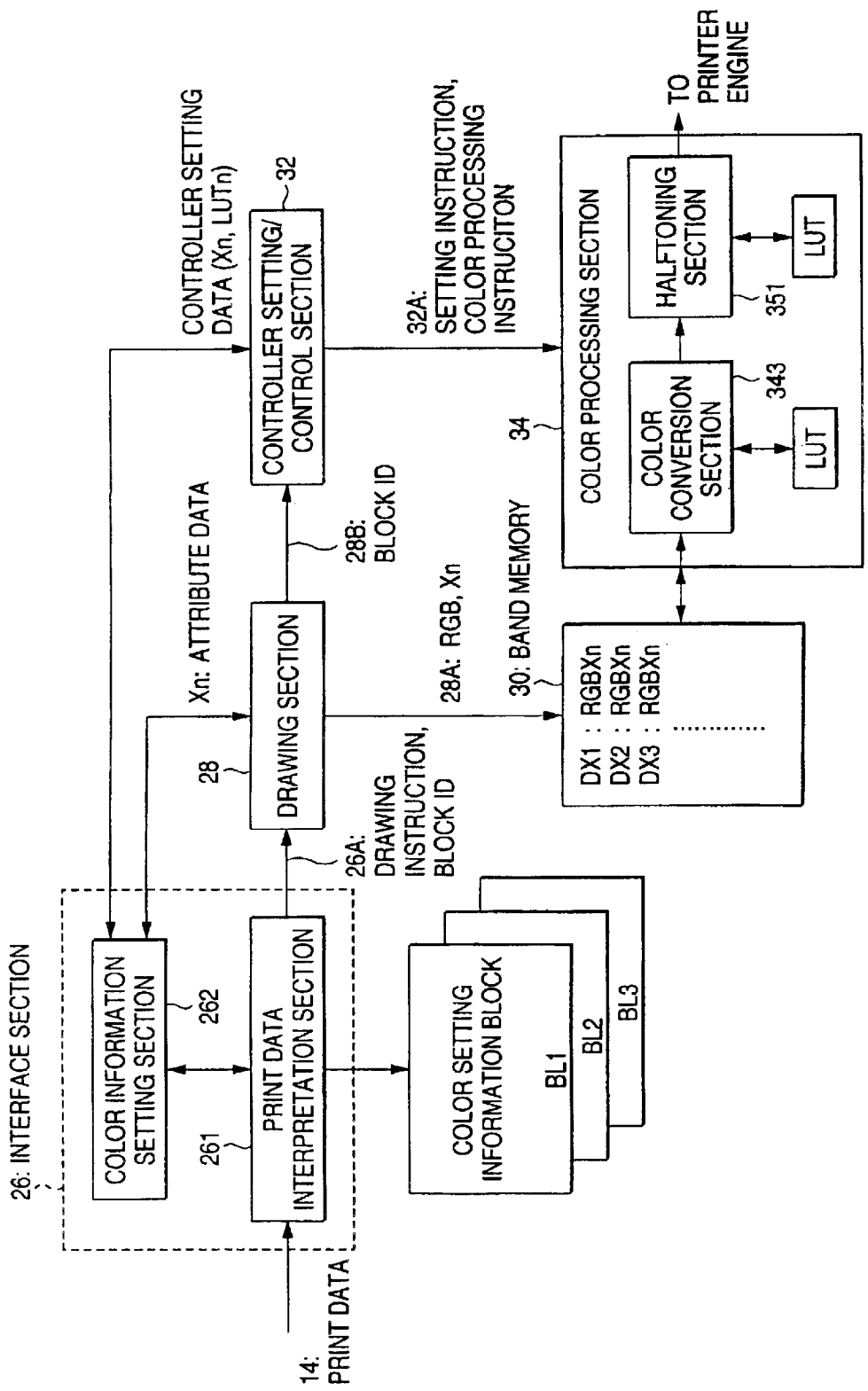
FIG. 6 is a detailed block diagram showing the controller of FIG. 3.
Figure 7:
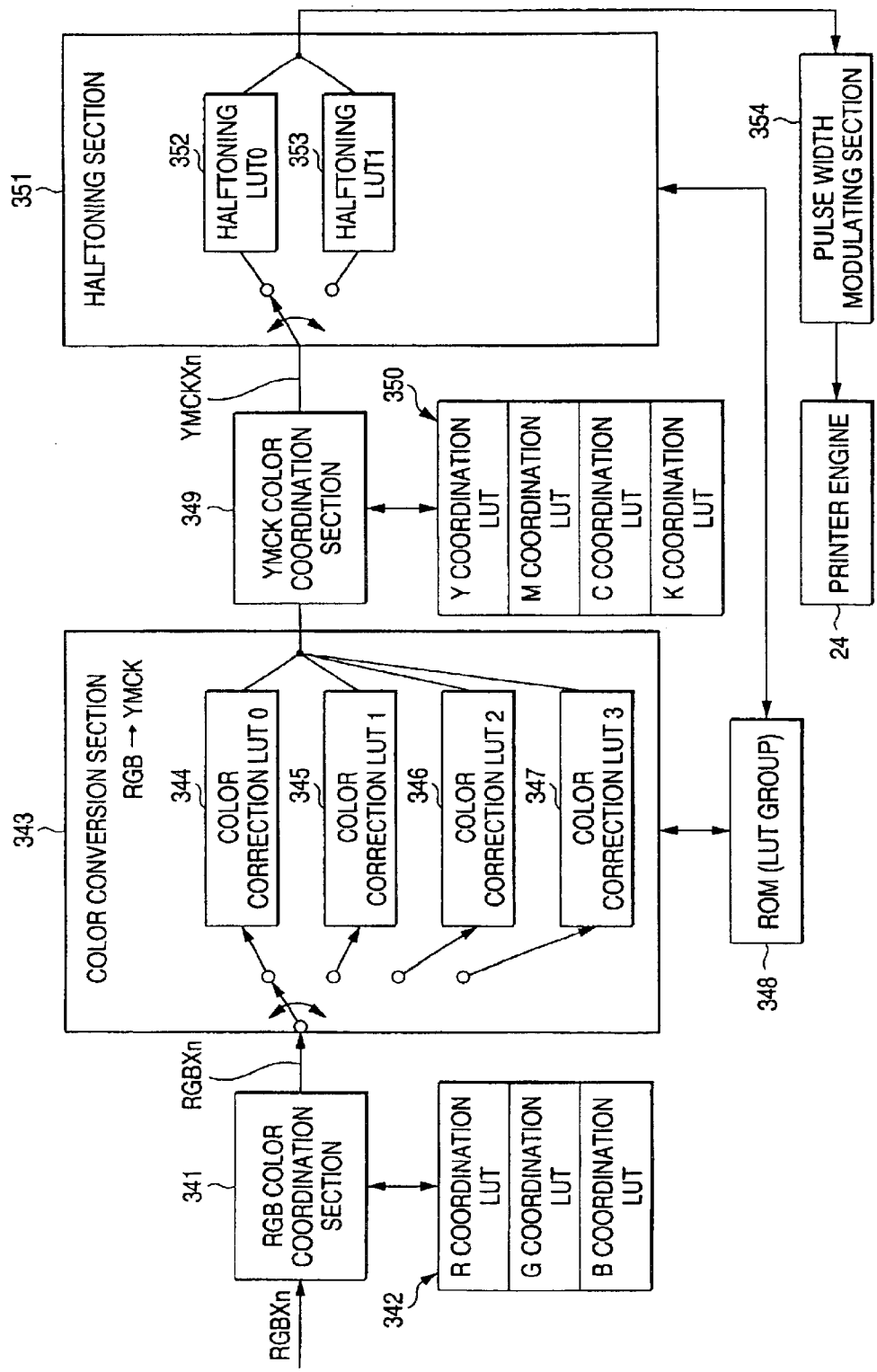
FIG. 7 is a detailed block diagram showing the color processing section of FIG. 3.
Figure 8:
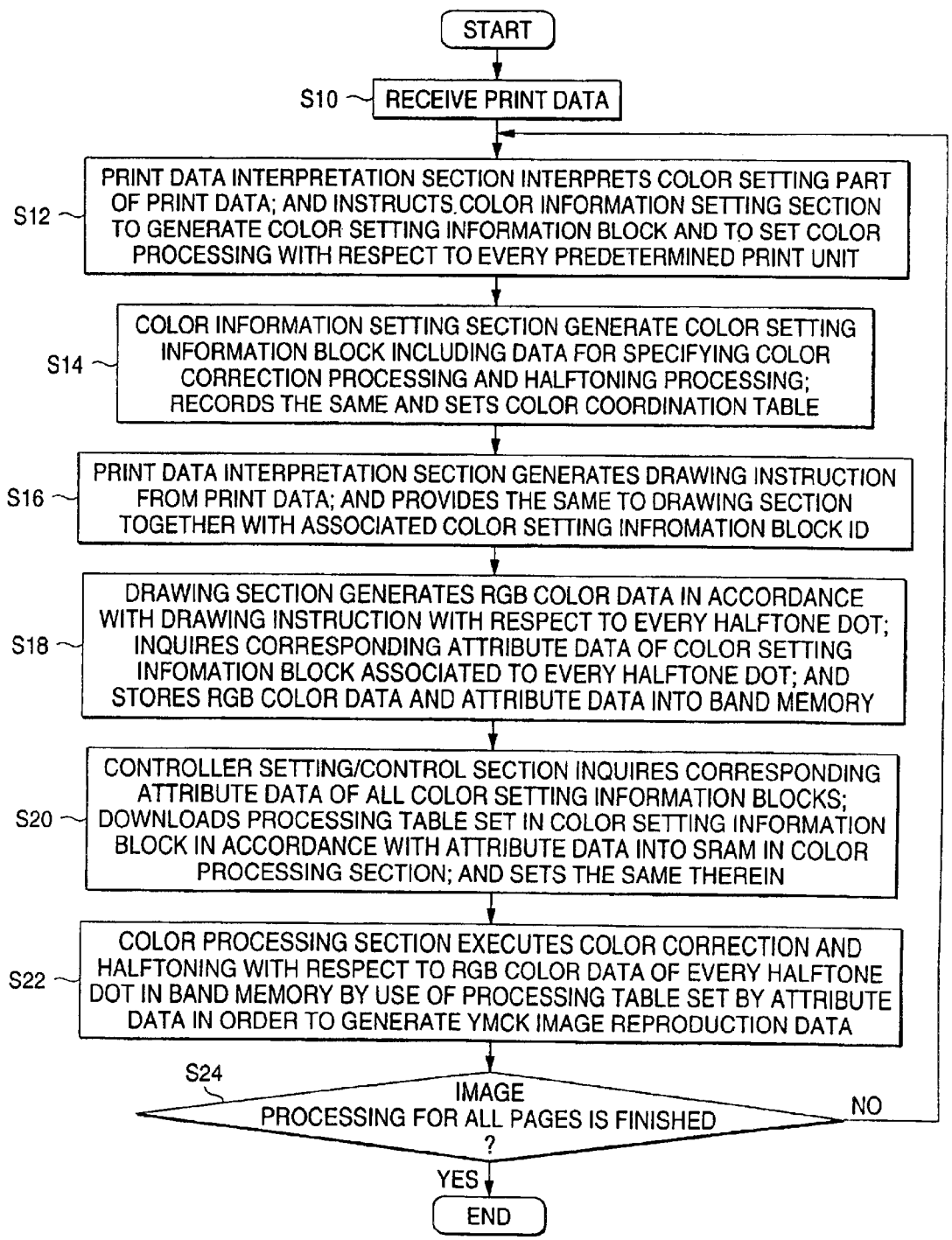
FIG. 8 is a flowchart showing image processing in the controller.

FIG. 6 is a detailed block diagram showing the controller 22 in an electrophotographic printer such as a laser printer. The same reference number is allocated to a part corresponding to that in FIG. 4. FIG. 7 is a detailed block diagram showing the color processing section 34. FIG. 8 is a flowchart showing image processing in the controller 22. Referring to these drawings, image processing in the controller will be described below.

The interface section 26, the drawing section 28 and the controller setting/control section 32 respectively in the controller 22 are respectively a function realized by software. Also, a color setting information block is recorded in a memory area and the band memory 30 is a predetermined image memory. Further, the color processing section 34 is realized by hardware for executing color processing according to attribute data Xn corresponding to color processing for RGB color data plotted in units of dot. Naturally, the color processing section 34 may be also a color processing function realized by software.

First, print data 14 is supplied from a computer and a print data interpreting section 261 in the interface section 26 receives it in S10. The interpreting section 261 interprets a color processing setting part in the print data 14 and requests a color information setting section 262 to secure a color setting information block BLn and set color processing in a predetermined print unit in S12. The color information setting section 262 generates the color setting information block BLn shown in FIG. 5 in response to the above request and records it in a predetermined memory in S14. Further, the color information setting section 262 generates look-up tables for color coordination 50 and 51, referring to RGB enhancing data 46 and YMCK enhancing data 47 respectively included in the print data 14. For example, the value of the following table is corrected according to enhancing data based upon a color coordination table which functions as a criterion and set by a creator of images and the look-up tables for color coordination 50 and 51 are generated.

The print data interpreting section 261 generates a drawing instruction 26A based upon the print data 14 and supplies it together with the corresponding color setting information block BLn to the drawing section 28 in S16. A drawing instruction means an instruction showing in which color, in which size, where and in which font a character "a" for example should be printed and is generated by interpreting the print data 14. Actually, ID data of a color setting information block BLn is supplied to the drawing section 28.

The drawing section 28 generates RGB color data every dot according to the supplied drawing instruction in S18. The drawing section also inquires of the color information setting section 262 attribute data Xn for a color setting information block to which a dot belongs. The color information setting section 262 generates attribute data Xn showing how tables set in the color processing section 34 should be combined based upon data in a block corresponding to ID data of the color setting information block in response to the above inquiry and supplies it to the drawing section 28. The drawing section 28 stores the generated RGB color data and the received attribute data Xn in the band memory 30 which is an image memory in S18.

The controller setting/control section 32 receives ID data of a block for one page from the drawing section 28 and inquires of the color information setting section 262 controller setting data showing how a color correction table and a halftoning processing table respectively set in the block should be set in the color processing section 34 in S20. The color information setting section 262 supplies the controller setting data to the controller setting/control section 32, referring to the color setting information block corresponding to the block ID data. The above controller setting data is data including attribute data Xn for example. The controller setting/control section 32 downloads table data corresponding to the leading address of a table included in the color setting information block according to the controller setting data into a high speed static random access memory (SRAM) in the color processing section 34 and sets it in S20.

As shown in FIG. 7, color correction tables 344 to 347 used for color correction in color conversion are downloaded from a read-only memory (ROM) 348 in which all types of tables are recorded into a color conversion section 343 in the color processing section 34 and set. Halftone processing tables 352 and 353 used in halftoning processing (binarization processing) are also downloaded from ROM 342 into a halftoning processing section 351.

At this time, the controller setting/control section 32 stores the data of a color coordination table in a color setting information block BLn in memory areas 342 and 350 for color coordination tables in the color processing section 34. In this embodiment, as shown in FIG. 7, as to the color coordination tables 342 and 350, only one type is generated in one page. However, if hardware in the color processing section 34 has unreserved capacity, plural types of color coordination tables set for every predetermined print unit can be set. In that case, attribute data corresponding to setting in the color processing section is generated as a color correction table and a halftoning processing table and stored every dot in the band memory 30.

When the tables 342, 344 to 347, 350, 352 and 353 in the color processing section 34 are set, the controller setting/control section 32 supplies an instruction to start color processing to the color processing section 34. In response to the supplied instruction, the color processing section 34 reads image data DX1, DX2, - - - composed of RGB color data and attribute data Xn from the band memory 30 by direct memory access. An RGB color coordination section 341 in the color processing section 34 executes color coordination processing such as coordinating the intensity of color for read color data RGB, referring to the set color coordination look-up table 342. Further, the coordinated color data RGB is supplied to the color conversion section 343.

The color conversion section 343 converts the color data of RGB to the color data of YMCK, referring to tables selected according to attribute data Xn out of the set color correction look-up tables 344 to 347. In conversion from RGB color space to YMCK color space, a color correction table specified in attribute data Xn is utilized, color matching is executed, original color is faithfully reproduced and the natural change of gradation is reproduced or processing for color correction in which priority is given to the brightness of color is executed.

A YMCK color coordination section 349 applies color coordination to the converted YMCK color data, referring to the set color coordination look-up table 350. For example, the intensity of specific color is emphasized. The halftoning processing section 351 executes halftoning processing by halftone dots composed of plural dots (binarization processing) for the YMCK color data in S22, selecting either of the halftoning processing look-up table 352 or 353 specified in attribute data Xn and referring to the selected table. As a result, image reproduction data composed of binary data of whether a dot is printed or not, or binary data of whether a further smaller area in a dot is printed or not, is generated. The image reproduction data is supplied to a pulse width modulating section 354, is modulated by a laser driving pulse signal in the printer engine and is supplied to the printer engine 24.

The above image processing steps S10 to S22 are repeated every page in S24. Therefore, in this embodiment, the setting of various tables in the color processing section 34 is changed if necessary every time the image processing of one page is execute. Therefore, even if the color processing section 34 composed of hardware in the controller 22 is provided with only a high speed static random access memory (SRAM) of relatively small capacity, many look-up tables for color processing can be suitably set. The setting of various tables in the color processing section 34 is not necessarily required to be changed in units of page. However, in a page printer such as a laser printer, as printing processing is executed every page, it is desirable that the setting of tables in the color processing section is also made every page.

FIG. 9 shows an example of the combination of a color correction look-up table and a halftoning processing table. In the above example of combination, if a fine halftone dot is utilized in halftoning processing, a halftoning processing table LUT0 is used and if a coarse halftone dot is utilized, a halftoning processing table LUT1 is used. If color correction is adapted to natural color, a color correction table LUT0 or LUT1 is used and if brightness is regarded as important, a color correction table LUT2 or LUT3 is used. The reason why two types of color correction tables exist is that two type of tables are required corresponding to two halftoning processing tables LUT0 and LUT1.

Attribute data X is shown for each combination of tables in FIG. 9. In the example of combination shown in FIG. 9, as shown in FIG. 7, four types of color correction tables and two types of halftoning processing tables are required. Therefore, the high order two bits of attribute data X are data for specifying four types of color correction tables and the low order one bit of the attribute data X is data for specifying two types of halftoning processing tables. Therefore, if attribute data X is 000, color conversion and halftoning processing are executed referring to the color correction table LUT0 and the halftoning processing table LUT0. That is, color processing adapted to natural color using a fine halftone dot is executed. If attribute data X is 100, the color correction table LUT2 and the halftoning processing table LUT0 are referred. That is, color processing using a fine halftone dot in which priority is given to brightness is executed and the above color processing is most suitable for a character and a graphic image in the example of color management shown in FIG. 2.

Further, if attribute data X is 011 and 111, color processing in which the same halftoning processing table LUT1 is utilized and the color correction tables LUT1 and LUT3 are respectively utilized is executed. Therefore, if attribute data X is 011, color processing adapted to natural color using a coarse halftone dot is executed and color processing the most suitable for an image is executed in the example of color management shown in FIG. 2.

As clear from the description of the combination of each table for color processing and attribute data X, a required table is set in the color processing section 34 by the color information setting section 262 and attribute data Xn is set corresponding to the setting of every color setting information block. The color processing section 34 can execute the most suitable color processing for color data every dot every predetermined print unit by selecting a table, the change of which is set every page according to attribute data Xn, and referring to the same without acquiring the information of which color processing is required. In addition, tables of any combination for color processing are not required to be provided in the color conversion section and the halftoning processing section in the color processing section 34, a table for one page has only to be set and more flexible color processing can be provided by small hardware.

Further, correspondence to the version up of color processing is enabled by changing data in a table stored in ROM without changing hardware configuration and generating a color setting information block together. The drawing section 28, the controller setting/control section 32 and the color processing section 34 are not required to detect which color processing is required by generating a color setting information block and utilizing attribute data Xn corresponding to the block. In addition, the types of attribute data Xn do not necessarily correspond to the number of all color setting information blocks.

In the above embodiment, the setting of tables in the color processing section is made every page, however, the setting of tables may be also made in units of band smaller than one page for example or the setting of tables may be also made in units of print job larger than one page. The number of set color correction tables and the number of set halftoning processing tables are not limited to the above examples. Further, plural color coordination tables can be also suitably set as color correction tables and halftoning processing tables as described above and in that case, more flexible color coordination can be provided to a creator of images.

As described above, according to the present invention, the image processor wherein more types of color processing can be executed by small hardware configuration can be provided. Optimum color processing or color processing desired by a creator of images can be realized in units of object and further, optimum color processing or color processing desired by a creator of images can be realized in a predetermined print unit smaller than an object.

What is claimed is:

1. An image processor for performing color conversion including color correction and halftoning of inputted print data to generate image reproduction data which represents gradation of each color by a plurality of halftone dots, comprising:

an interface section, operable to interpret the print data to generate a drawing instruction and attribute data indicating required color correction and halftoning in each of first print areas, and operable to determine required color correction and halftoning in a second print area including the first print areas;

a drawing section, operable to generate color data based on the drawing instruction, and operable to store the color data and the attribute data in an image memory for each of the first print areas; and a color processing section, operable to select at least one color correction processing table and at least one halftoning processing table which are used in the color correction and the halftoning executed in the second print area, out of color correction processing tables and halftoning processing tables, and operable to execute the color correction and the halftoning with respect to each of the color data in the image memory using the selected processing tables designated by the attribute data associated with the color data to be processed, in order to obtain the image reproduction data;

wherein the plural color correction processing tables and halftoning processing tables are previously stored in a read only memory; and the color processing section includes a random access memory in which the selected color correction processing table and halftoning processing table are stored.

2. The image processor as set forth in claim 1, wherein:
the interface section generates a color setting information block including color enhancement data; and
a color coordination table is set in the color processing section in accordance with the color enhancement data to execute color coordination processing with respect to the color data.

3. The image processor as set forth in claim 1, wherein the interface section generates a color setting information block including information for specifying the determined color correction and halftoning.

4. The image processor as set forth in claim 1, wherein the second print area is every printed page.

5. The image processor as set forth in claim 1, wherein the first print area is an image object including at least one of a character and an image.

6. The image processor as set forth in claim 1, wherein the first print area is each of the halftone dots.

7. An image processing method for performing color conversion including color correction and halftoning of inputted print data to generate image reproduction data which represents gradation of each color by a plurality of halftone dots, comprising steps of:

interpreting the print data to generate a drawing instruction and attribute data indicating required color correction and halftoning in each of first print areas;

determining required color correction and halftoning in a second print areas including the second print areas;

generating color data based on the drawing instruction for each of the first print areas;

storing the color data and the attribute data in an image memory for each of the first print areas;

selecting at least one color correction processing table and at least one halftoning processing table which are used in the color correction and the halftoning executed in the second print area, out of color correction processing tables and halftoning processing tables; and executing the color correction and the halftoning with respect to each of the color data in the image memory using the selected processing tables designated by the attribute data associated with the color data to be processed, in order to obtain the image reproduction data;

wherein the plural processing tables are previously stored in a read only memory, and the method further comprising the steps of:

storing the selected color correction processing table and halftoning processing table into a random access memory.

8. The image processing method as set forth in claim 7, further comprising steps of:

generating a color setting information block including color enhancement data;

setting a color coordination table in accordance with the color enhancement data; and executing color coordination processing with respect to the color data in accordance with the color coordination table.

9. An image processor for performing halftoning of inputted print data to generate image reproduction data, comprising:
- an interface section, operable to interpret the print data to generate drawing instructions and attribute data indicating required halftoning in each of image objects;
- a drawing section, operable to store color data with the attribute data in an image memory based on the drawing instructions; and
- a color processing section, provided with a random access memory in which at least one halftoning processing table to be used in the halftoning for a predetermined print area, which is downloaded from an external memory in which a plurality of halftoning processing tables are stored, the color processing section operable to execute the halftoning using the at least one halftoning processing table in the random access memory which is designated by the attribute data.

10. The image processor as set forth in claim 9, wherein the predetermined print area is every printed page.

* * * * *